Dec. 18, 1934.  W. H. WINEMAN  1,984,389
CLUTCH
Filed Feb. 14, 1931
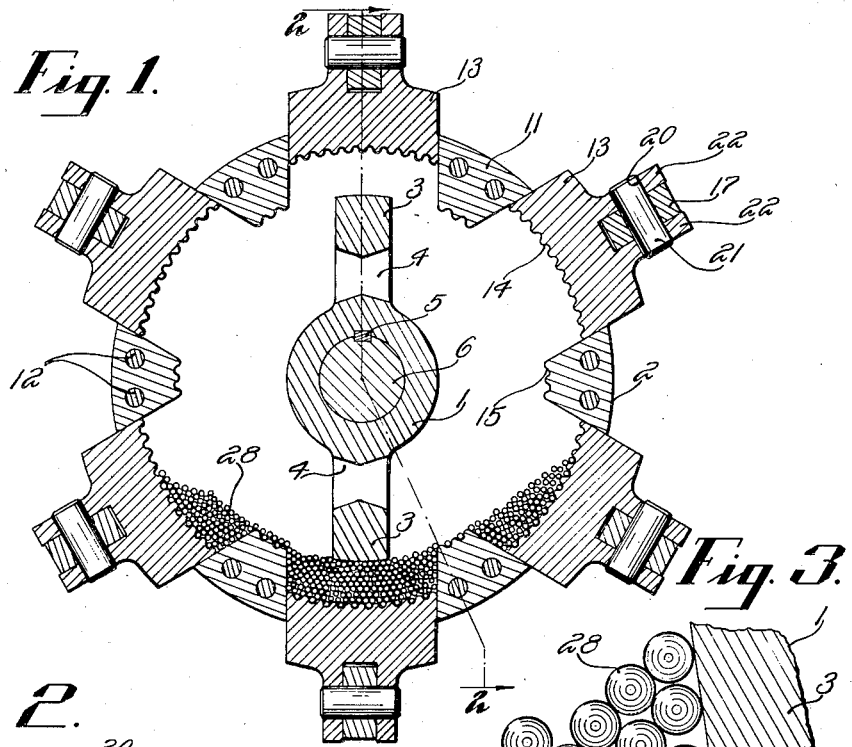
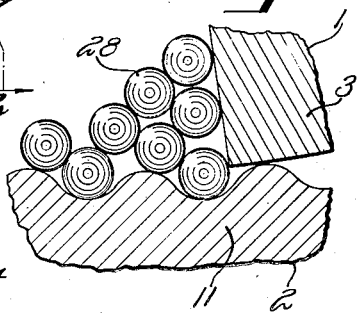
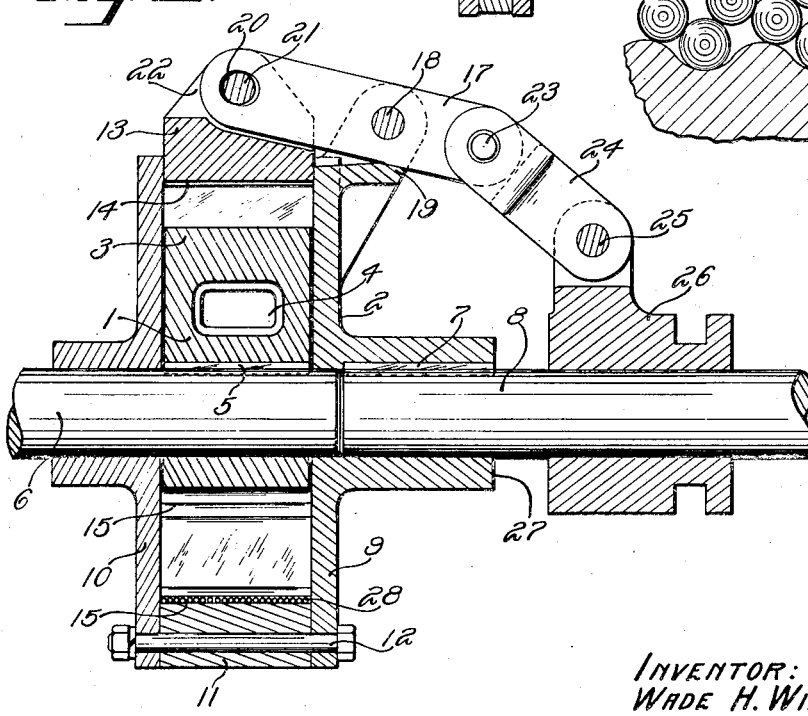
INVENTOR:
WADE H. WINEMAN.
BY
ATT'Y.

Patented Dec. 18, 1934

1,984,389

UNITED STATES PATENT OFFICE 1,984,389

CLUTCH

Wade H. Wineman, Michigan City, Ind., assignor to Sullivan Machinery Company, a corporation of Massachusetts Application February 14, 1931, Serial No. 515,795

17 Claims. (Cl. 192—58)

My invention relates to clutches and more particularly to clutches of the centrifugal type.

An object of my invention is to provide an improved clutch employing centrifugal force and having improved controlling mechanism permitting the effecting of clutching or of cessation of the transmission of driving force as may be desired. More specifically, an object of my invention is to provide an improved and readily controllable clutch of the type in which shot or the like are used in effecting the transmission of the driving force. Other objects and advantages of the invention will, however, hereinafter more fully appear.

In the accompanying drawing, in which there is shown for purposes of illustration one form which my invention may assume in practice, Fig. 1 presents a section transverse to the axis of rotation of the illustrative embodiment of my invention;

Fig. 2 is an approximately axial section on planes corresponding to the line 2—2 of Fig. 1; and Fig. 3 is an enlarged detail view.

Referring to the drawing, it will be observed that my improved clutch mechanism, as disclosed for purposes of illustration, comprises two main parts, an inner rotor 1 and an outer shell 2. The inner rotor member 1 carries impeller blades 3 and these are preferably provided with orifices 4 spaced from their outer ends for a reason which will subsequently be explained. The inner rotor member is keyed at 5 to a driving shaft 6. The outer shell 2 is keyed at 7 to the shaft 8 which is to be driven. The shell is formed herein of a pair of opposite end members 9, 10 rigidly connected together by a series of arcuate members 11 arranged cylindrically and held in position between the end members 9 and 10 by through bolts 12. Guided for sliding movement between the members 11 are radially movable elements 13, which in their inner positions, have their peripheries 14 in the same annular zone in which the inner peripheries 15 of the arcuate members lie. The surfaces 14 and 15 are provided with serrations, and when the elements 13 are in their innermost positions the internal periphery of the shell is in the form, as it were, of a corrugated cylinder. The inner diameter of the shell is of such size relative to the overall diameter of the impeller that the blades 3 just clear the serrated surfaces. For the purpose of moving the elements 13 radially, lever members 17 are pivotally supported at 18 on ears 19 carried by the head member 9. In slots 20 formed at one end of the levers 17 are pins 21 extending between ears 22 carried by the outer ends of the elements 13. The other ends of the lever 17 are pinned at 23 to links 24 carried by pins 25 upon a longitudinally slidable clutch member 26. The proportions of the parts are so selected that upon movement of the clutch shipper member 26, into abutment with a surface 27 formed on the head member 9, the internal surfaces 14 on the elements 13 are brought into the same annular zone with the surfaces 15 on the parts 11. Obviously, if desired, stop shoulders might be formed near the outer ends of the members 13 for engagement with the outer surfaces of the members 11. A suitable quantity of fluid material such as chilled shot 28 is enclosed within the casing. The quantity of shot may be so selected, if desired, that it may be all received within the spaces formed by the withdrawal of the elements 13 with the clutch at rest, although a larger quantity may be employed, if this is considered desirable.

When the clutch is at rest and the elements 13 are in their extreme innermost positions, the chilled shot will lie at the bottom of the shell. On starting the motor driving the shaft 6, the impeller blades will revolve within the casing, driving the shot before them until a speed is reached at which centrifugal force will act to pack the shot down to cause the impeller, so to speak, to pick up the shell and revolve it with it. At normal driving speed the shot accumulate to such an extent that the impeller becomes in effect locked to the shell. Overloading is cared for by reason of the fact that on overloading a reduction in speed takes place, with the result that the centrifugal force lessens and slipping takes place.

When it is desired to discontinue the driving without stopping the motor, the clutch shipper member 26 may be moved to the right from its drive effecting position until the parts occupy a position such as is shown in Figs. 1 and 2. This results in a withdrawal of the members 13, and the shot may be received within the pockets formed by the radial withdrawal of the members 13 and drive may be completely interrupted. When it is desired to resume drive, the members 13 may be forced inwardly radially again. The openings 4 when present tend to permit the shot, which accumulate in front of the blade prior to the actual initiation of full speed driving, to slip through to the rear sides of the blade, thereby reducing wear and facilitating freedom of motion at low speeds.

It will be seen that the summed distances between the arc swept through by the ends of the impeller blades and all of the points in the inner periphery of the casing or shell member, is considerably increased when the members 13 are in their outermost positions. Accordingly, the average distance between the impeller and the interior of the casing must be increased also the average clearance, that is to say, the average of all of the different clearances at all the points during a complete relative rotation of impeller and shell. While it is preferable that the inner member serve as an impeller, a reversal, with drive by the outer member, can be effected by suitable modification.

From the foregoing description, it will be clear that I have provided an improved clutch of the centrifugally actuated shot type, in which it is unnecessary to stop the motor if the discontinuance of drive is desired; in which a series of simple but effectively acting parts are present; and which will be durable and rugged.

While there is in this application specifically described one form which this invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a clutch mechanism, a shell, an impeller therein, said shell having a roughened inner periphery and confining a quantity of solid particles of small size but substantial mass, said particles, when subjected to the centrifugal force attendant upon desired speed of shell and impeller rotation, being operative to lock the impeller and shell against relative rotation, and means for permitting said confined particles to move, substantially exclusively in planes to which the axis of said impeller is perpendicular, out of the path of the impeller while the speed of said impeller is maintained undiminished, and for returning said particles to the path of the impeller at will.

2. In a clutch mechanism, a shell, an impeller therein, said shell having a roughened inner periphery and confining a quantity of solid particles of small size but substantial mass, said particles, when subjected to the centrifugal force attendant upon desired speed of shell and impeller rotation, being operative to lock the impeller and shell against relative rotation, and means for permitting said confined particles to move, substantially exclusively radially of said shell, out of the path of the impeller, while maintaining the speed of said impeller undiminished, and for returning said particles to the path of the impeller at will.

3. In a clutch mechanism, an impeller and a shell within which said impeller is included, said shell having a roughened inner periphery and confining a quantity of solid particles of small size but substantial mass, said particles when subjected to the centrifugal force attendant upon desired speed of shell and impeller rotation, being operative to lock the impeller and shell against relative rotation, and said shell having in at least one wall thereof means permitting, at the will of an operator, and with the speed of said impeller remaining relatively constant, the movement of said particles out of the path of the impeller, said means being movable to force said particles back into the path of the impeller at will.

4. In a clutch mechanism, an impeller and a shell within which said impeller is enclosed, said shell having therein a quantity of particles of small size but substantial mass, and having one wall thereof provided with a sliding section to form on sliding thereof a pocket to receive the particles in a position beyond the sweep of the impeller.

5. In a clutch mechanism, an impeller and a shell within which said impeller is enclosed, said shell having therein a quantity of particles of small size but substantial mass, and having one wall thereof provided with a plurality of radially sliding sections to form on sliding thereof pockets to receive the particles in a position beyond the sweep of the impeller.

6. In a clutch mechanism, an impeller and a shell within which said impeller is enclosed, said shell having therein a quantity of particles of small size but substantial mass, and having one wall thereof provided with a plurality of radially sliding sections to form on sliding thereof pockets to receive the particles in a position beyond the sweep of the impeller, and means movable axially of the clutch mechanism to move said sections radially.

7. In a clutch mechanism, a rotatably mounted shell member, a rotatably mounted bladed member within the shell member, means for positively rotating one of said members, a quantity of particles of substantial mass within the shell member, said particles, when subjected to the centrifugal force attendant upon desired speed of shell member and bladed member rotation, being operative to lock the bladed member and shell member against relative rotation, and means for increasing the average distance between the shell member and the axis of rotation of the bladed member at will.

8. In a clutch mechanism, a rotably mounted shell member, a rotatably mounted member within the shell member provided with blades having a fixed projection therefrom, means for positively rotating one of said members, a quantity of particles of substantial mass within the shell member, and means operative while said shell member and rotatably mounted member remain in uniform relative longitudinal relation, for increasing at will the average radial clearance between the shell member and the blades of the bladed member.

9. In a clutch mechanism, a rotatably mounted shell member, a rotatably mounted bladed member within the shell member, means for positively rotating one of said members, a quantity of particles of substantial mass within the shell member, and means associated exclusively with the shell member for increasing at will the average clearance between the shell member and the blades of the bladed member.

10. In a clutch mechanism, a rotatably mounted shell member, a member, also rotatably mounted, disposed within the shell, said members confining a space between them and so formed that upon relative rotation there is an alteration of the confined space, a fluid mass within the confined space engageable during power transmission with both of said members and operative on rotation of one of said members to transmit motion from said member to the other member, and means for effecting an increase in the confined space to permit movement of the still confined fluid mass wholly out of engagement with one of said members at will while the latter continues to rotate.

11. In a clutch mechanism, a rotatable shell providing a single chamber, a rotatable bladed member disposed within said chamber, said shell having a roughened inner periphery and confining a fluid medium of substantial mass, said medium, when subjected to the centrifugal force attendant upon desired speed of shell and bladed member rotation, being operative to lock the bladed member and shell against relative rotation, and means for increasing the peripheral dimensions of said chamber for permitting said medium to move out of engagement with the bladed member while maintaining the same confined within said shell member.

12. In a clutch mechanism, a rotatable shell providing a chamber, and a rotatable bladed member disposed within said chamber, said shell having a roughened inner periphery and confining a fluid medium of substantial mass, said medium, when subjected to the centrifugal force attendant upon desired speed of shell and bladed member rotation, being operative to lock the bladed member and shell against relative rotation, and said shell member having in at least one wall thereof means providing at least one chamber enlargement having a movable wall and having communication with said chamber proper equal in area to the area of said movable wall for permitting movement of said medium out of engagement with the bladed member while still maintaining the same confined.

13. In a clutch mechanism, a bladed member and a shell within which said bladed member is enclosed, said shell having therein a fluid connecting medium of substantial mass, and having one wall thereof provided with a sliding section to form on sliding thereof a pocket to receive said medium in a position beyond the sweep of the bladed member.

14. In a clutch mechanism, a bladed member and a shell within which said bladed member is enclosed, said shell having therein a fluid connecting medium of substantial mass, and having one wall thereof provided with a plurality of radially sliding sections to form on sliding thereof pockets to receive said medium in a position beyond the sweep of the bladed member.

15. In a clutch mechanism, a bladed member and a shell within which said bladed member is enclosed, said shell having therein a fluid connecting medium of substantial mass, and having one wall thereof provided with a plurality of radially sliding sections to form on sliding thereof pockets to receive said medium in a position beyond the sweep of the bladed member, and means movable axially of the clutch mechanism to move said sections radially.

16. In a clutch mechanism, a rotatable shell having associated therewith relatively movable wall-forming means, said shell and relatively movable wall-forming means cooperating to provide a single chamber of variable volume, a rotatable bladed member disposed within said chamber, said chamber provided by said shell and wall-forming means having a roughened peripheral wall and containing a fluid medium of substantial mass which when subjected to the centrifugal force attendant upon desired speed of shell and bladed member rotation is operative to lock the impeller and shell against relative rotation, and means for permitting movement of said wall-forming means relative to said shell to increase the volume of said chamber to permit movement of said medium out of engagement with the bladed member while still maintaining said medium confined and for effecting positive movement of said wall forming means to restore engagement between said fluid medium and said bladed member.

17. In a clutch mechanism, an impeller and a shell in which said impeller is included, said shell having a roughened inner periphery and confining a quantity of particles of small size but substantial mass, said particles, when subjected to centrifugal force attendant upon desired speed of shell and impeller rotation, being operative to lock the impeller and shell against relative rotation, and said shell having means in the outer peripheral wall thereof for permitting, at the will of the operator and while the speed of the impeller remains substantially constant, movement of the confined particles at both sides of the central transverse plane of said impeller directly out of the path of the impeller, said means being movable to force said particles back into the path of the impeller at will.

WADE H. WINEMAN.